United States Patent

Chang

(10) Patent No.: US 7,033,491 B2
(45) Date of Patent: Apr. 25, 2006

(54) AQUARIUM FILTER

(75) Inventor: Yung-Sheng Chang, Hsichih (TW)

(73) Assignee: Hi-Q Bio-Tech International, Ltd., Ping Tung (TW)

(*) Notice: Subject to any disclaimer, the term of this patent is extended or adjusted under 35 U.S.C. 154(b) by 0 days.

(21) Appl. No.: 10/892,086

(22) Filed: Jul. 16, 2004

(65) Prior Publication Data

US 2006/0011529 A1   Jan. 19, 2006

(51) Int. Cl.
*A01K 63/04* (2006.01)
*B01D 35/027* (2006.01)
*C02F 3/06* (2006.01)

(52) U.S. Cl. .............. 210/169; 210/150; 210/151; 210/220; 210/416.2; 119/260; 119/263

(58) Field of Classification Search .............. 210/150, 210/151, 169, 232, 416.1, 416.2, 615, 620, 210/220; 119/227, 259, 260, 263
See application file for complete search history.

(56) References Cited

U.S. PATENT DOCUMENTS

| | | | | |
|---|---|---|---|---|
| 5,096,576 A | * | 3/1992 | Szabo | 210/150 |
| 5,108,594 A | * | 4/1992 | Giovanetti et al. | 210/151 |
| 5,223,129 A | * | 6/1993 | Hsieh | 210/150 |
| 5,242,582 A | * | 9/1993 | Marioni | 210/151 |
| 5,690,819 A | * | 11/1997 | Chianh | 210/150 |
| 2003/0006177 A1 | * | 1/2003 | Lari et al. | 210/123 |

FOREIGN PATENT DOCUMENTS

WO    WO 02/30835    *   4/2002

\* cited by examiner

*Primary Examiner*—Fred G. Prince
(74) *Attorney, Agent, or Firm*—Leong C. Lei

(57) ABSTRACT

An aquarium filter to increase dissolved oxygen and improve water quality comprised of a box containing a segregated water inlet tank, a water collection tank, and multiple filtration tanks; water introduced into the water inlet tank being pumped by a submerged motor and mixed with air introduced from the ambient to be flushed to the water collection tank; the water being bumped against bio-filtration balls in filtration tank for the beneficial microbes to get attached to the filtration balls to consume hazardous microbes.

1 Claim, 4 Drawing Sheets

AQUARIUM FILTER

BACKGROUND OF THE INVENTION (a) Technical Field of the Invention

The present invention is related to an aquarium filter, and more particularly to one promotes dissolved oxygen and improves water quality in the aquarium.

(b) Description of the Prior Art

With increased income, people are paying more attention to leisure activities and improved living environment. Other than landscaping, pets are major companions for many people in searching for consolation to their souls. Pets include animals and aquatic species.

Most of the aquatic species are raised in an aquarium. Excrements and residual feeds constitute the sources of contamination to the aquarium to affect the water quality and poor quality will easily cause the aquatic species to become sick. Meanwhile, the dissolved oxygen in the water fails to meet as required. Therefore, a filter and an air bulb generator are adapted to the aquarium to filtrate the water and provide sufficient amount of oxygen to maintain a living space desirable for and upgrade the surviving rate of the aquatic species. Though the air bulb generator is usually disposed at the bottom of the aquarium, the time is too short to generate sufficient oxygen since the air bulbs rises fast to the surface of the water. As a result, only a limited amount of oxygen is dissolved in the water. Furthermore, the filter of the prior art filtrates only solid substances including the excrements and is unable to filtrate microbes in the water. The hazardous microbes surviving the filtration naturally will deteriorate the water quality. As a result, frequent replacement with fresh water is required and becomes a burden to the owner.

SUMMARY OF THE INVENTION

The primary purpose of the present invention is to provide an aquarium filter to increase the amount of dissolved oxygen and improve the water quality for maintaining an optimal living environment for the aquatic species. To achieve the purpose, the present invention is comprised of a box containing a segregated water inlet tank, a water collection tank and multiple filtration tanks. The water in the aquarium is first introduced into the water inlet tank and the ambient air is pumped into the water inlet tank by means of a submerged pump. The water is then flushed into the water collection tank to allow more oxygen to be dissolved in the water due to the flushing before flowing into those multiple filtration tanks to impact against multiple bio-filtration balls provided in the filtration tanks for the beneficial microbes to get attached to the bio-filtration balls for consuming the hazardous microbes.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
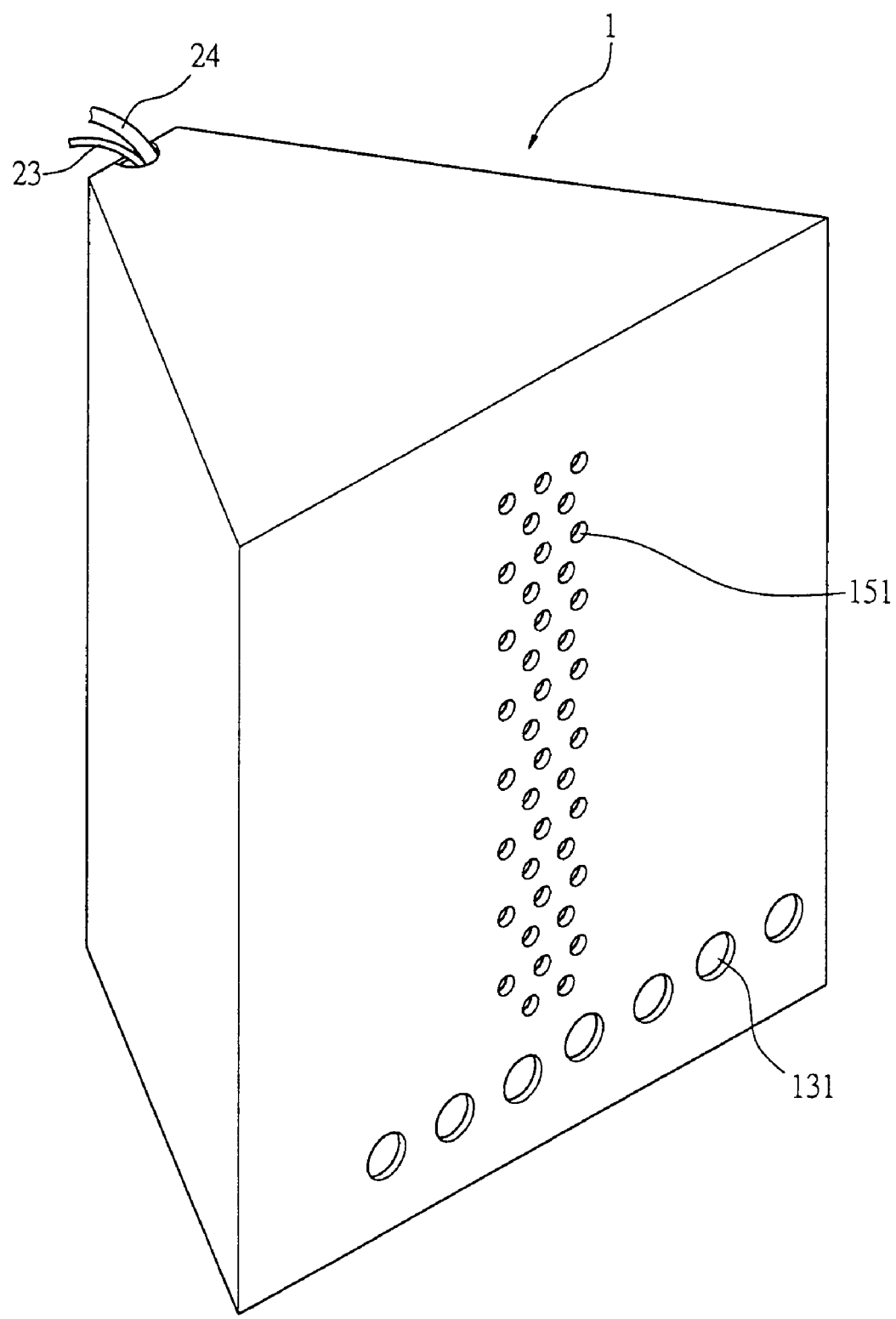
FIG. 1 is a perspective view of a preferred embodiment of the present invention.
Figure 2:
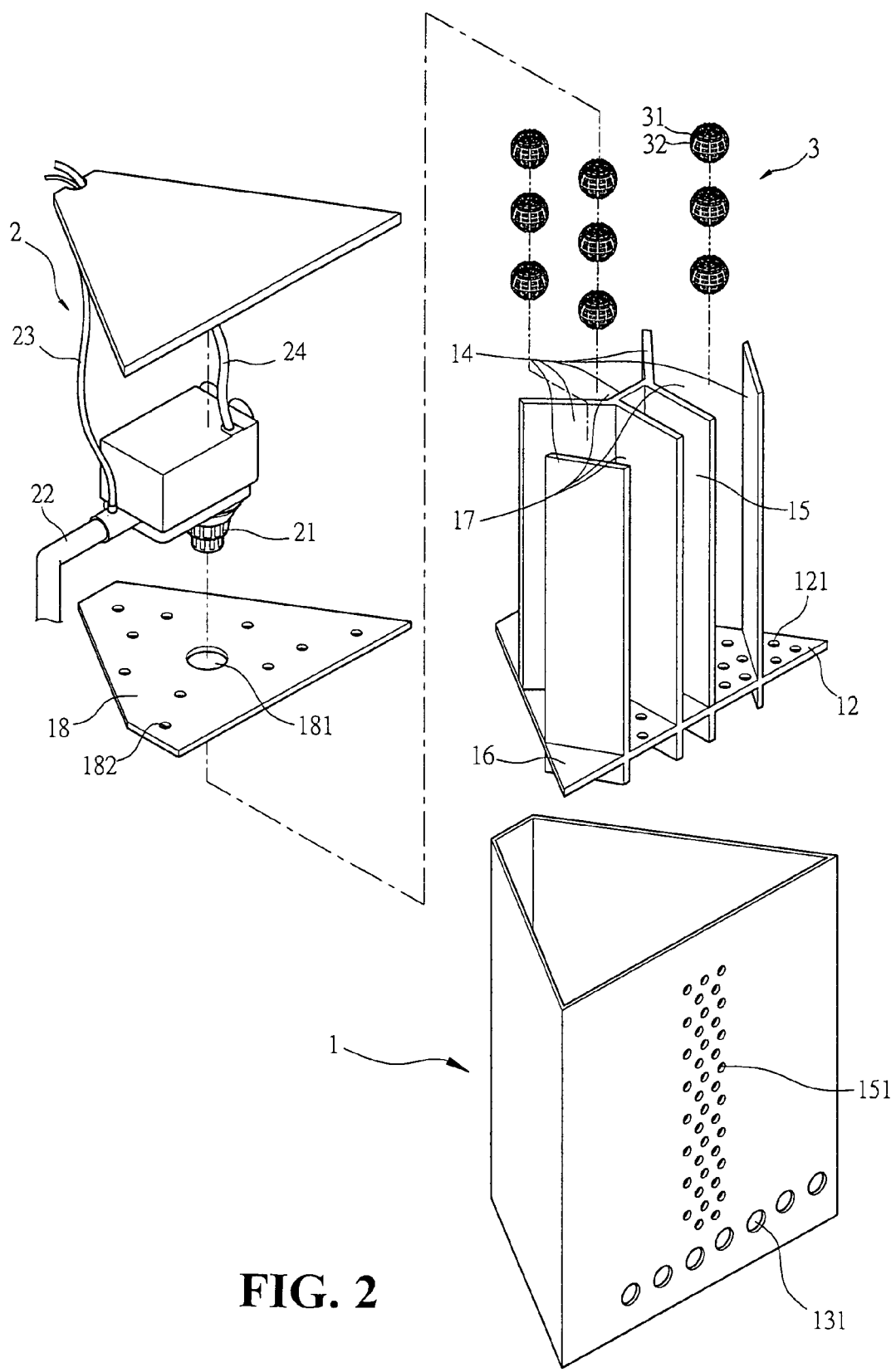
FIG. 2 is an exploded view of the preferred embodiment of the present invention.
Figure 3:
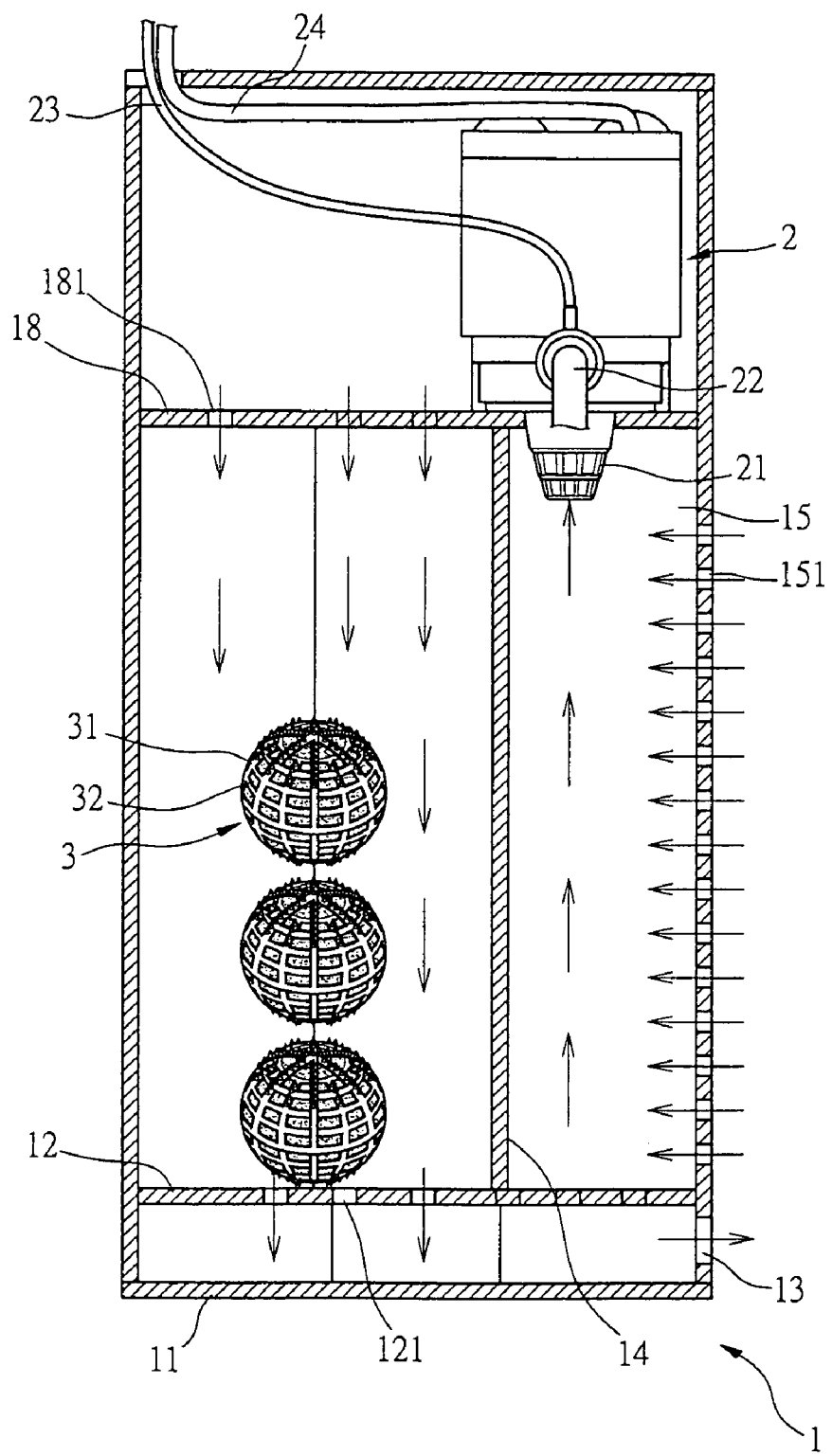
FIG. 3 is a sectional view of the preferred embodiment of the present invention.

An aquarium filter of the present invention is an additional item attached to the aquarium completed with an air bulb generator and a filter disposed on the top of the aquarium of the prior art. Referring to FIGS. 1, 2, and 3, the present invention may be fixed at a corner by means of hooks or other fasteners to the aquarium (not illustrated) and is essentially comprised of a box 1, a submerged pump 2, and multiple bio-filtration balls 3. The box 1 approximately indicates a triangle resting in place on a corner of the aquarium. The box 1 may be made in any other shape depending on the style of the aquarium. A lower lateral partition 12 is provided at where close to a base plate 11 and a drainage area 13 is defined between the base plate 11 and the lower lateral partition 13. The drainage area 13 connects through the aquarium with multiple holes 131. Multiple upright partitions 14 segregate the space above the lower lateral partition 12 into a water inlet tank 15 in the center, a water collection tank 16 on the corner, and multiple filtration tanks 17. Multiple holes 121 are provided on the lower lateral partition 12 at the bottom of each filtration tank 17 to connect each filtration tank through the drainage area 13. Multiple bio-filtration balls 3 are placed inside each filtration tank 17. The bio-filtration ball 3 relates to a hollow sphere 31 containing a filter 32. The water inlet tank 15 connects through the aquarium with multiple holes 151. An upper lateral partition 18 with a corner knocked off in comparison with the lower lateral partition 12 covers over the water inlet tank 15 and all filtration tanks 17. A through hole 181 is disposed on the upper lateral partition 18 at where in relation to the water inlet tank 15, and multiple holes 182 are disposed on the upper lateral partition 18 at where in relation to each filtration tan 17. A water pumping pipe 21 and a water outlet pipe 22 respectively extend from the submerged pump 2 into the water inlet tank 15 and into the water collection tank 16. An air inlet pipe 23 is connected to the water outlet pipe 22 and a lid 19 covers up the opening on the top of the box 1 while leaving a gap to permit the air inlet pipe 23 and a power cable 24 for the submerged pump 2 to reach out of the box before the gap is sealed up.

Figure 4:
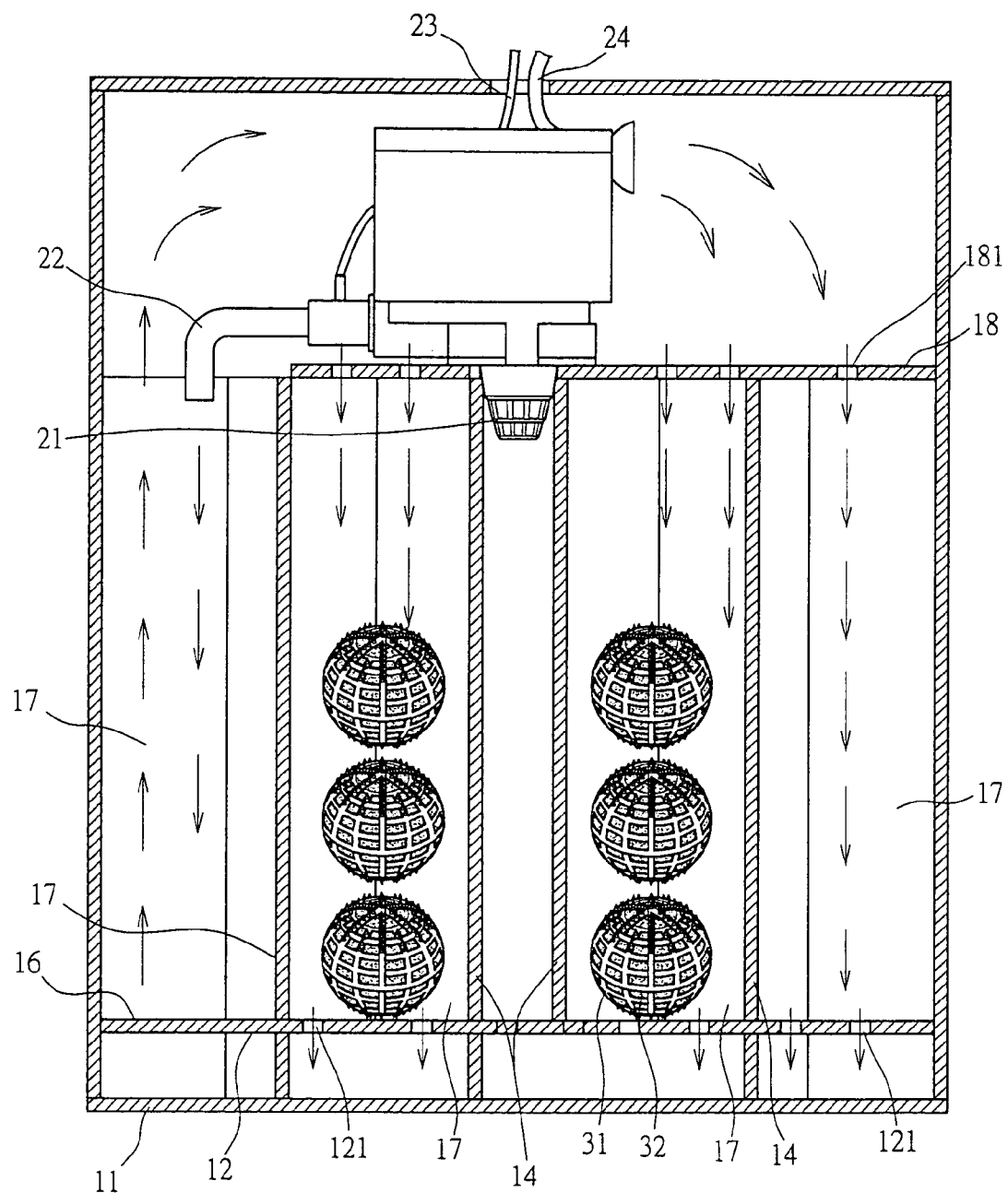
FIG. 4 is a schematic view showing the working status of the preferred embodiment of the present invention.

Now referring to FIGS. 3, and 4, the water pumping pipe 21 penetrating into the water inlet tank 15 creates suction force when the submerged pump 2 is started to pump the water in the aquarium into the water inlet tank 15 through those hole 151 while admitting the ambient air into the water outlet pipe 22 to mix with the water. The admixture of water and air is delivered into the water collection tank 16. Whereas the bottom of the water collection tank 16 is blocked, the water newly introduced flushes against then existing water in the water collection tank 16 to allow further mixing of the air and water thus to increase the amount of dissolved oxygen in the water. Once the level in the water collection tank 16 rises above the upper lateral partition 18, the water enters into the filtration tanks 17 through each through hole 181 to collide with spheres 31 in those bio-filtration balls placed inside each filtration tank 17 for oxygen to be consistently dissolved in the water to further increase the amount of dissolved oxygen in the water. Meanwhile, those surviving beneficial microbes are separated and attached to the filter 32 in the sphere 31 to consume the hazardous microbes for improving water quality. The water after the collision flows to the drainage area 13 through those holes 121 disposed on the bottom of the filtration tank 17 and discharged through those holes 131 into the aquarium to complete a cycle of filtration. The cycle of filtration completed helps increase amount of dissolved oxygen in the water and improves water quality to provide optimal living environment for the aquatic species in the aquarium.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An aquarium filter including a box, a submerged pump and multiple bio-filtration balls; the box roughly in the shape of a triangle, a lower lateral partition being disposed near a base plate of the box; a drainage area being defined between the lower lateral partition and the base plate; the drainage area connecting through the aquarium with multiple holes; multiple vertical partitions segregating the space above the lower lateral partition into a water inlet tank at center, a water collection tank on the corner and multiple filtration tanks; multiple holes being disposed on the lower lateral partition at the bottom of each filtration tank to connect through the drainage area; multiple bio-filtration balls each comprised of a hollow sphere containing a filter being placed in each filtration tank; the water inlet tank connecting through the aquarium with multiple holes; an upper lateral partition with a knocked-off corner covering up the water inlet tank and each filtration tank; a through hole being disposed on the upper lateral partition in relation to the water inlet tank; multiple holes being disposed on the upper lateral partition at where in relation to each filtration tank; a water pumping pipe extending from the submerged pump into the water inlet tank via the trough hole in the upper lateral partition; a water outlet pipe extending from the submerged pump into the water collection tank; an air inlet pipe being connected to the water outlet pipe; a lid covering up an opening at the top of the box; and a gap permitting the air inlet pipe and a power cable from the submerged pump to reach out of the box before being sealed.

* * * * *